United States Patent [19]
Corvi

[11] Patent Number: 5,104,281
[45] Date of Patent: Apr. 14, 1992

[54] APPARATUS FOR HANDLING GOODS ON INDUSTRIAL VEHICLES

[75] Inventor: Gianguido Corvi, Piacenza, Italy

[73] Assignee: Elba 2 S.R.L., Milan, Italy

[21] Appl. No.: 508,951

[22] Filed: Apr. 12, 1990

[30] Foreign Application Priority Data

Apr. 14, 1989 [IT] Italy ............................. 20138 A/89

[51] Int. Cl.⁵ .............................................. B60P 1/34
[52] U.S. Cl. ........................ 414/528; 254/104; 254/88; 198/809; 414/491
[58] Field of Search ............ 414/527, 528, 495, 492, 414/493, 494, 531; 254/5 R, 5 B, 5 C, 88, 104; 198/809

[56] References Cited

U.S. PATENT DOCUMENTS

| | | | |
|---|---|---|---|
| 2,819,037 | 1/1958 | Wilkin | 254/104 |
| 4,261,682 | 4/1981 | Papps et al. | 414/528 |
| 4,790,515 | 12/1988 | Pocci | 254/104 |
| 4,844,684 | 7/1989 | Bradley | 414/528 |
| 4,909,378 | 3/1990 | Webb | 414/528 X |

FOREIGN PATENT DOCUMENTS 528553 5/1954 Belgium .................. 254/88

*Primary Examiner*—Frank E. Werner
*Attorney, Agent, or Firm*—Hoffmann & Baron

[57] ABSTRACT

The apparatus comprises a framework (8) adapted to be fixed to the platform (3) of an industrial vehicle and on which a substantially horizontal loading level surface (14) is defined. Distributed along the opposite ends (11, 12) of the apparatus framework are first and second cog wheels (2, 4) operable in rotation and operatively engaging respective roller chains (15) exhibiting each a dragging portion (15a) extending longitudinally to the loading level surface (14). The dragging portion of each chain is slidably supported by a slidable guide (22) movable along a slot (23) longitudinally formed in the loading level surface so as to bring the dragging portion from a rest position in which it is disposed below the loading level surface to a working position in which it slightly projects upwardly from the loading level surface.

9 Claims, 3 Drawing Sheets

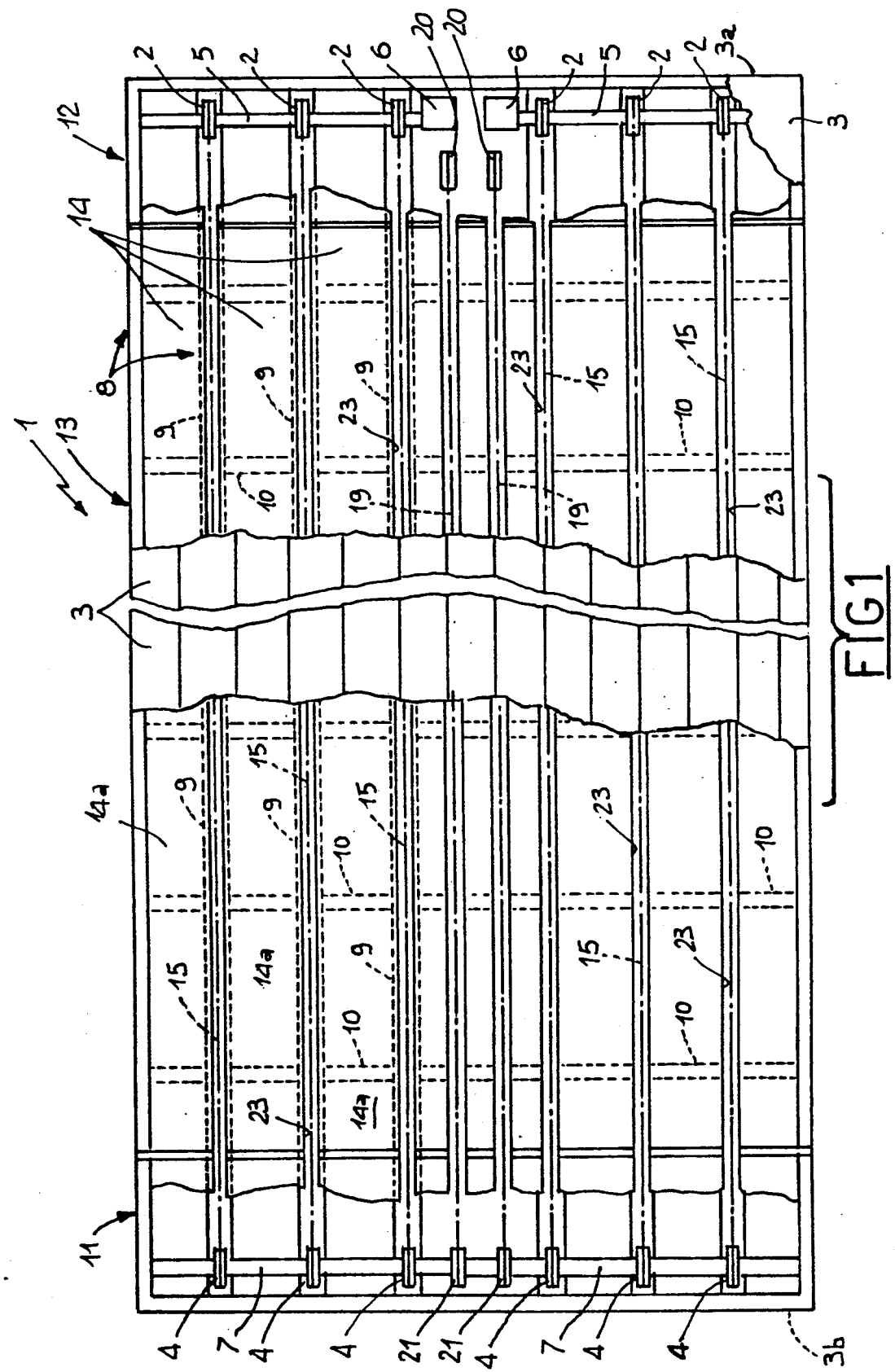

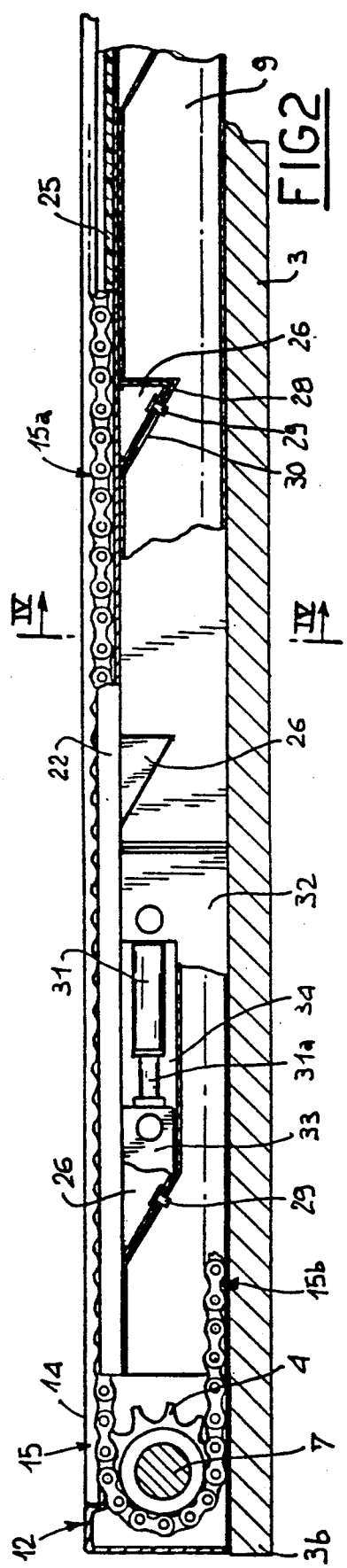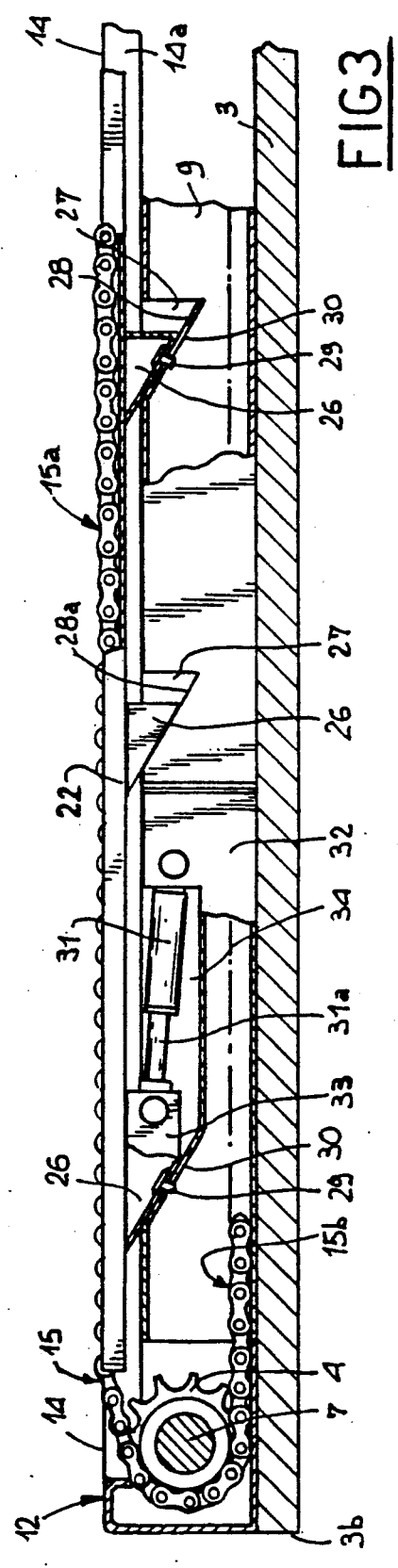

APPARATUS FOR HANDLING GOODS ON INDUSTRIAL VEHICLES

BACKGROUND OF THE INVENTION

1. Field of the Invention

The present invention relates to an apparatus for handling goods on industrial vehicles, of the type comprising: first guide cog wheels distributed along one end of a vehicle platform; second guide cog wheels distributed along a second end of said vehicle platform and aligned each with one of the first guide cog wheels; a number of roller chains each passing over one of the first guide cog wheels and one of the second guide cog wheels and exhibiting a dragging portion extending longitudinally to the vehicle platform.

In greater detail, the apparatus in reference lends itself to be installed on trucks and/or trailers of tractor semitrailers in order to facilitate the handling of loads on pallets or, at all events, loads consisting of big packages during the goods loading and unloading operations.

2. Prior Art

It is known that, in order to facilitate the handling of goods on industrial vehicles in many cases provision is made for the use of devices essentially consisting of a number of idler rollers having parallel axes which are aligned in several rows extending parallelly along the vehicle loading platform. Under working conditions said rollers slightly project upwardly from the vehicle loading platform so that the goods are enabled to travel thereon without sliding on the platform itself. Once the loading or unloading operations have been completed, the rollers can be lowered so that the goods can directly rest on the vehicle platform and are no longer subjected to displacements while the vehicle is running.

While these devices facilitate the handling of the goods on the vehicle platform, they are not capable of carrying out the handling of the goods in a self-contained manner. In fact, the goods must be always pushed by hand or by other systems in order to achieve their handling.

In view of eliminating this drawback other devices have been provided which comprise a number of flexible cables extending each between respective guide pulleys operable in rotation by one or more motors. Each cable has a dragging portion arranged so as to slide, as a result of the operation of the respective pulleys, along an antifriction guide extending longitudinally on the vehicle platform. The goods disposed on the loading platform lay on the dragging portions of the cables and can therefore be displaced when said cables are moved.

These devices offer an improved operation as compared with those using idler rollers but, on the other hand, they have some drawbacks too.

One drawback resides in that, in spite of the fact that the cables rest on guides made of antifriction material, the handling of the goods always needs an important waste of energy, so as to win frictions developing between the cables and said guides. In addition, antifriction guides are subjected to wear and must be periodically replaced.

Another drawback is given by the fact that the goods laying on the cables are slightly raised with respect to the vehicle platform also when the vehicle is running. Taking into account this precarious support it is clear that during the running undesired shiftings of the goods on the platform can easily take place.

Other envisaged devices use roller chains instead of the above flexible cables. In known solutions these devices are conceptually identical to the previously described devices and therefore they exhibit the same drawbacks as with the use of cables.

Another drawback of the devices of the known art is that they can be installed only on motor vehicles in which the vehicle platform and frame have been previously arranged for the engagement of the different members forming the device itself. Therefore these devices can only be mounted on loading platforms constructed expressly and offering appropriate expedients. If on the contrary the device needs to be installed on a vehicle platform devoid of said expedients, long working times are necessary in view of adapting the platform to installation requirements of the device.

SUMMARY OF THE INVENTION

The main object of the present invention is substantially to solve all the above mentioned problems and drawbacks relating to the known art.

The foregoing and further objects that will become more apparent in the course of the present description are substantially attained by an apparatus for handling goods on industrial vehicles, comprising a number of sliding guides each supporting the dragging portion of a respective chain in the region of the rollers being part of the chain itself, each of said slidable guides being housed in a slot longitudinally formed in a loading level surface on which the goods are disposed and being movable along the slot so as to bring said dragging portion from a working condition in which it projects upwardly from the loading level surface to a rest condition in which it is housed inside the slot under the loading level surface, first and second driving means being provided in order to drive in rotation the guide cog wheels and move said dragging portions from the rest condition to the working condition and vice versa, respectively.

BRIEF DESCRIPTION OF THE DRAWINGS

Further features and advantages will be best understood from the detailed description of a preferred embodiment of an apparatus for handling goods on industrial vehicles in accordance with the present invention, given hereinafter by way of non-limiting example, with reference to the accompanying drawings, in which:

FIG. 1 is a diagrammatic fragmentary top view of an apparatus for handling goods in accordance with the present invention;

FIG. 2 is a partly sectional side view of one portion of the apparatus seen in FIG. 1 in a rest condition;

FIG. 3 shows the same apparatus portion as in FIG. 2 in a working condition;

DESCRIPTION OF THE PREFERRED EMBODIMENT

Figure 4:
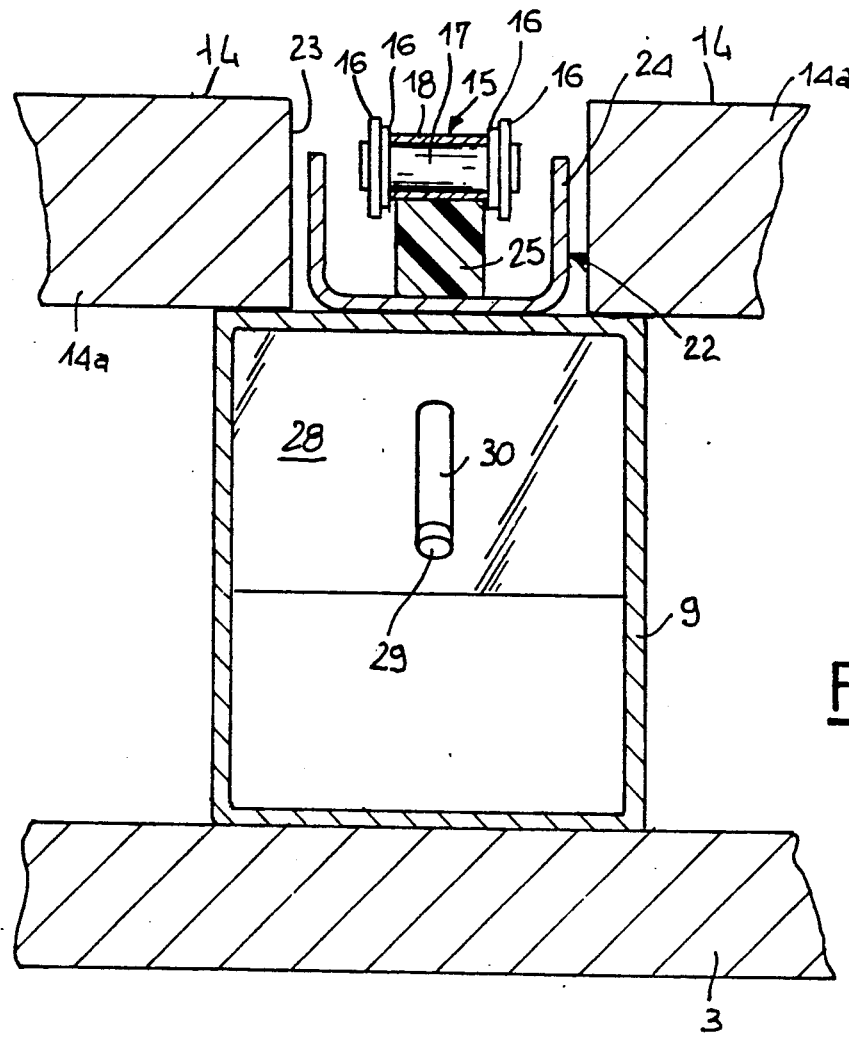
FIG. 4 is an enlarged sectional view taken along line IV—IV in FIG. 2, showing one of the sliding guides associated with the apparatus.

Referring particularly to FIG. 1, an apparatus for handling goods on industrial vehicles in accordance with the invention has been generally identified by reference numeral 1.

Apparatus 1 comprises a plurality of first guide cog wheels 2 distributed along one end 3a of a vehicle platform 3 conventionally associated with an industrial vehicle. Distributed along a second end 3b of the vehicle platform 3 is a plurality of second cog wheels 4, each of them being in alignment with one of the first cog wheels 2.

The first cog wheels are keyed on at least a drive shaft 5 operable in rotation through first driving means preferably comprising at least a hydraulic motor 6. In the embodiment shown the cog wheels 2 are divided into two groups, and a drive shaft 5 operable by a respective hydraulic motor 6 is associated with each group.

The second cog wheels 4, in turn, are rotatably engaged on at least a support shaft 7 extending along the second end 3b of the vehicle platform 3.

Preferably, in accordance with the invention, the drive 5 and support 7 shafts, as well as all other members being part of apparatus 1, are mounted on a support framework generally identified by 8, fastened to the vehicle platform 3 and substantially extending according to the whole surface thereof. The support framework 8 comprises a plurality of longitudinal members 9, preferably consisting of tubular rectangularly-shaped section members extending longitudinally to the vehicle platform 3, in alignment with the guide cog wheels 2, 4 and mutually connected by means of reinforcing crosspieces 10 spaced apart a predetermined distance from one another.

Preferably the support framework 8 as a whole is divided into a first and a second head 11 and 12 disposed at the opposite ends 3a, 3b of the vehicle platform 3, between which a central portion 13 extends. Advantageously, housed in heads 11 and 12 are the guide cog wheels 2, 4, shafts 5, 7, hydraulic motors 6, as well as all other members for the operation of apparatus 1, to be described in the following.

Also associated with the framework 8 is a plurality of covering plates 14a disposed on the longitudinal members 9 and crosspieces 10 and defining a loading level surface 14 located slightly above the cog wheels 2, 4, on which the goods loaded on the vehicle having apparatus 1 associated therewith are transported and carried.

Figure 5:
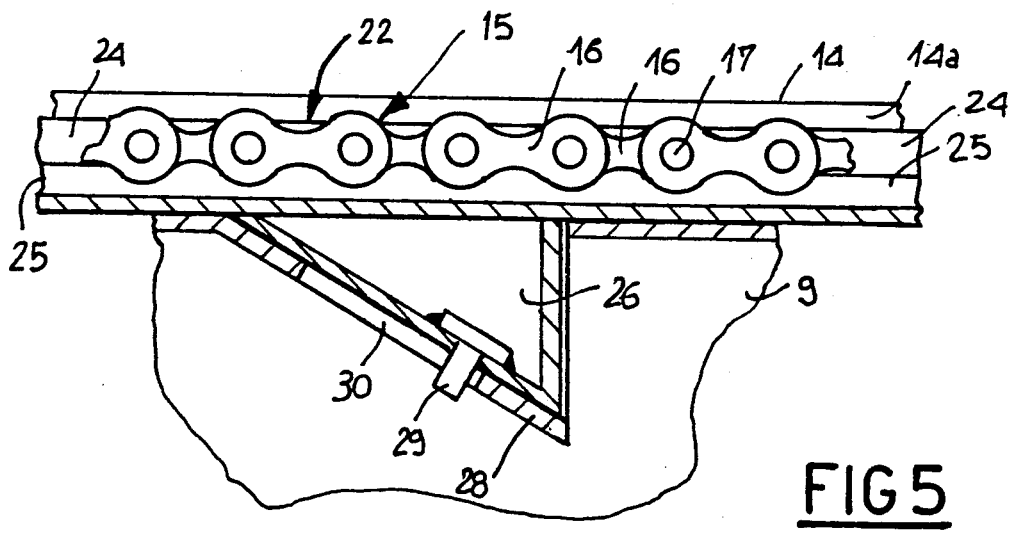
FIG. 5 is an enlarged partly sectional side view of a detail shown in FIG. 2.

Apparatus 1 also comprises a plurality of roller chains 15, each of them, as clearly shown in FIGS. 4 and 5, essentially consisting of a number of connecting links 16 rotatably engaged to each other through pivots 17 each of them rotatably carrying a roller 18. The roller chains 15 are disposed parallelly in side by side relation and extend longitudinally to the vehicle platform 3, each chain operatively passing over one of the first cog wheels 2 and one of the second cog wheels 4. In greater detail, each roller chain 15 is engaged to the respective cog wheels 2, 4 so as to exhibit a dragging portion 15a (FIGS. 2 and 3) extending above one of the longitudinal members 9 and designed to carry out a longitudinal translation relative to the vehicle platform 3 as a result of the rotation imparted to the cog wheels 2 and 4 acted upon by the hydraulic motors 6. A return stretch 15b of chain 15, extending parallelly to and underneath the dragging portion 15a, is slidably guided at the inside of the corresponding longitudinal member 9.

Advantageously, due to the presence of two hydraulic motors 6 associated with the respective drive shafts 5, the roller chains 15 are ideally divided into two groups taking opposite locations with respect to the longitudinal center line of the loading level surface 14 and selectively operable, independently of each other.

Advantageously, two or more additional chains 19 (FIG. 1) can be provided, which extend parallelly to the roller chains 15 close to the center line of the loading level surface 14 and operatively engaged, in the same manner as the roller chains 15, between two guide cog wheels 20, 21 disposed at either end of the loading level surface 14 and rotating idly.

Still in accordance with the present invention, the dragging portion 15a of each chain 15 and of each additional chain 19 is advantageously slidably engaged along a slidable guide 22 housed in a corresponding slot 23 formed longitudinally relative to the vehicle platform 3. Each slidable guide 22 is essentially comprised of a channel 24 inside which a support element 25 for the corresponding chain 15 acting upon rollers 18 belonging to the chain itself, longitudinally extends. Preferably the support element 25 is made of a material having a low friction coefficient.

The slidable guides 22 and the guides associated with the additional chains 19 are movable, upon the action of second driving means to be described in the following, within the slots 23 so as to bring the dragging portions 15a of the corresponding chains 15 from a working condition in which each dragging portion slightly projects upwardly from the loading level surface 14, to a rest condition in which each dragging portion is disposed under the level of the loading level surface.

To this end, as regards the second driving means each slidable guide 22 integrally carries, at the lower part thereof, a plurality of wedge-shaped lifting blocks 26 which are each accommodated in housings 27 matching the shape of the blocks and formed in the corresponding longitudinal member 9. In greater detail each block 26 comes in abutment against an inclined plane 28a formed with a plate-like element 28 fastened to the longitudinal member 9 in the region of the housing 27. Preferably at least a pin 29 is provided to project from each block 26, which pin slidably engages in a guide slot 30 formed in the plate-like element 28 parallelly to the longitudinal extension of the slidable guide 22.

In addition, in the second driving means each slidable guide 22 as well as each guide associated with the additional chains 19 is acted upon by at least a hydraulic cylinder 31 housed in the head 12 disposed close to the second end 3b of the vehicle platform 3. In greater detail, as clearly shown in FIGS. 2 and 3, each hydraulic cylinder 31 is pivoted, according to a horizontal axis, to a projecting portion 32 located in the head 12 and extending on the continuation of the corresponding longitudinal member 9. The cylinder 31 by its rod 31a acts on a bracket 33 integrally carried by the sliding guide 22. In the example shown, the bracket 33 is of one piece construction with one of the lifting blocks 26 located at the corresponding end of the slidable guide 22 and operatively accommodated in a housing 34 formed in the projecting portion 32 inside which the bracket 33 and hydraulic cylinder 31 are accommodated as well.

OPERATION

Operation of the apparatus according to the invention described above mainly as regards structure, is as follows.

The two groups of roller chains 15 can be indifferently operated simultaneously or separately from each other, so that the handling of the goods may be carried out on the whole width of the loading level surface 14 or in two separate steps where in each step half the width of the loading level surface is concerned. The operation of each chain group takes place by the activation of the corresponding hydraulic cylinders 31 through a hydraulic feed circuit interlocked to said cylinders and to the respective hydraulic motor 6.

As a result of said activation each cylinder 31 causes a longitudinal displacement of the corresponding slidable guide 22. By the engagement of the lifting blocks 26 on the corresponding inclined planes 28a, said longitudinal displacement brings about a vertical translation of the slidable guide 22. Consequently, the dragging portion 15a of the corresponding chain 15 is brought from the rest position to the working position so that the goods disposed on the loading level surface 14 are kept slightly raised relative to the loading level surface itself, since they are supported by the upper edges of the connecting links 16 belonging to the roller chains 15.

Once the dragging portions 15a of chains 15 and of the additional chains 19 if present have taken their working position, the hydraulic motor 6 is operated. Operation of the hydraulic motor causes the first cog wheels 2 to be rotated, which gives rise to the movement of the dragging portions 15a of chains 15 and, as a result, the goods are moved along the loading level surface 14.

Advantageously, as the dragging portions 15a of chains 15 rest on the slidable guides 22 only in the region of the respective rollers 18, the only resistance offered to the movement of the dragging portions will be represented by the rolling friction of rollers 18 on the respective pivots 17 and on the support elements 25. Therefore, the handling of the goods on the loading level surface 14 will take place with a low waste of energy even when the goods weight is important.

Advantageously, the optional presence of the additional chains 19 prevents the goods from being subjected to sliding on the loading level surface 14 in the central areas thereof. In fact the additional chains 19 can offer a support for the goods which will be dragged along by them without their movement being hindered.

Obviously the hydraulic motors 6 will be able to rotate in either way, depending upon the circumstances, so that the goods can be both loaded onto and unloaded from the motor vehicle.

Once the loading and unloading operations have been completed, the hydraulic cylinders 31 are operated so as to cause the return of the dragging portions 15a to their rest condition.

Due to the lowering of the dragging portions 15a of chains 15 and of the additional chains 19, the goods present on the loading level surface 14 can come properly in contact with said platform and rest thereon. Therefore the goods do not run the risk any longer of being subjected to undesirable movements on the loading level surface while the vehicle is running.

The present invention attains the intended purposes.

In fact, the use of roller chains supported by the respective sliding guides as above described allows frictions developed during the goods handling to be remarkably reduced with respect to the known art. Thus the waste of energy and the wear of the members designed to carry out the handling of the goods are remarkably reduced.

In addition, as it is possible to lower the dragging portions of the chains below the loading level surface, the goods are stable while the vehicle is running.

It will be appreciated that, as the apparatus in question has a framework of its own, it can be easily mounted on the platform of any motor vehicle without involving additional workings for adaptation purposes.

Obviously may modifications and variations can be made to the invention as conceived, all of them falling within the scope of the inventive idea characterizing it.

What is claimed is:

1. Apparatus for handling goods on an industrial vehicle, the industrial vehicle having a vehicle platform which defines a loading level surface in which are longitudinally formed a plurality of slots, the vehicle platform having opposite first and second ends, the apparatus comprising:

first guide cog wheels distributed along the first end of the vehicle platform;

second guide cog wheels distributed along the second end of the vehicle platform which is opposite to the first end, each of said second guide cog wheels being aligned with each of the first guide cog wheels and forming a pair of aligned first and second cog wheels;

a plurality of parallel first roller chains, each of said parallel first roller chains engaging over each pair of aligned first and second cog wheels and exhibiting a dragging portion to move the goods relative to the platform and extending longitudinally with respect to the vehicle platform, each first chain including a multiplicity of parallel rollers mounted on orthogonal, opposed parallel links;

a plurality of slidable guides, each guide having a longitudinally extended support element supporting the rollers of the dragging portion of each first chain, said links serving to guide the chain, whereby said rollers are able to rotate on the support element, each of said slidable guides being housed in a respective slot longitudinally formed in the loading level surface on which the goods are disposed and being movable along the slots so as to bring said dragging portion from a working condition in which the dragging portion projects upwardly from the loading level surface to a rest condition in which the dragging portion is housed inside the slot under the loading level surface;

first driving means for driving in rotation the first and second guide cog wheels; and second driving means for moving said dragging portion from the rest condition to the working condition and vice versa.

2. The apparatus as claimed in claim 1, wherein said first driving means comprises at least a hydraulic motor acting on a drive shaft on which said first guide cog wheels are keyed.

3. The apparatus as claimed in claim 1, wherein the second driving means comprises, for each of said slidable guides, a plurality of lifting blocks fastened at the lower part thereof to the slidable guide and operatively engaging on respective inclined planes which are fixed relative to the loading level surface, said blocks being arranged so that they slide on the inclined planes thereby causing the dragging portion of the corresponding first chain to be disposed in a rest condition and in an operative condition as a result of longitudinal movements imparted to the slidable guide upon command of a hydraulic cylinder.

4. The apparatus as claimed in claim 3 wherein each of said inclined planes consists of a plate fastened to the inside of a housing formed under the loading level surface and designed to accommodate the corresponding lifting block.

5. The apparatus as claimed in claim 4, wherein a pin is associated with each of said lifting blocks and slidably engages in a guide slot formed in said plate.

6. The apparatus as claimed in claim 1, wherein said loading level surface comprises a plurality of covering plates disposed in coplanar relation with one another on a framework fastened to the vehicle platform.

7. The apparatus as claimed in claim 6, wherein said framework comprises a plurality of longitudinal members mutually interconnected by connecting crosspieces and extending each under, one of the slidable guides so as to support the slidable guide laying thereon.

8. The apparatus as claimed in claim 1, further comprising at least an additional second chain extending longitudinally to the loading level surface and two idler cog wheels respectively disposed at the first and second ends of the vehicle platform, said additional second chain engaging the two idler cog wheels and exhibiting a dragging portion disposed on a respective slidable guide and movable from the rest condition to the working condition through said second driving means.

9. The apparatus as claimed in claim 8, wherein the loading level surface of the vehicle platform includes a median area and side areas on opposite sides of the media area; and wherein the plurality of parallel first roller chains are situated at the side areas of the loading level surface and the additional second chain is situated at the median area of the loading level surface.

* * * * *